(No Model.)
G. CURLEY.
SAUCEPAN COVER.
No. 568,970. Patented Oct. 6, 1896.
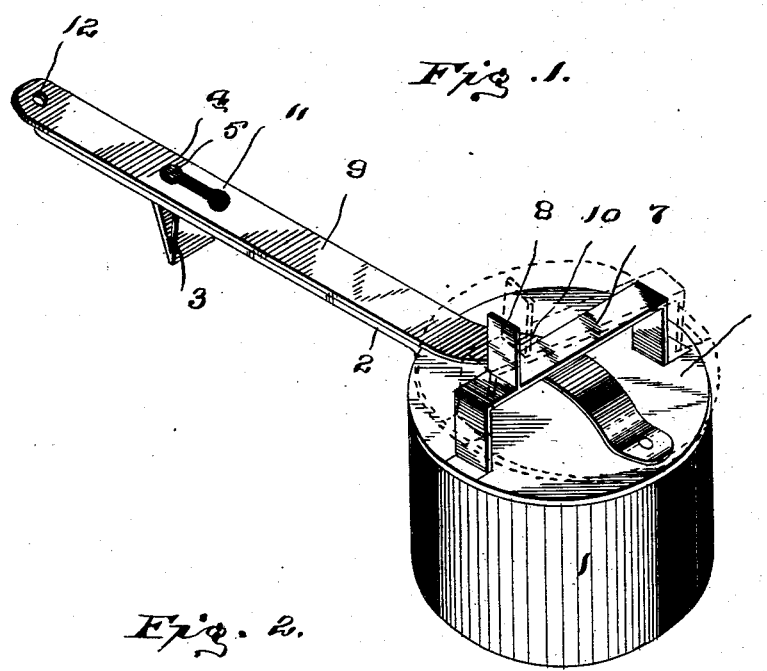
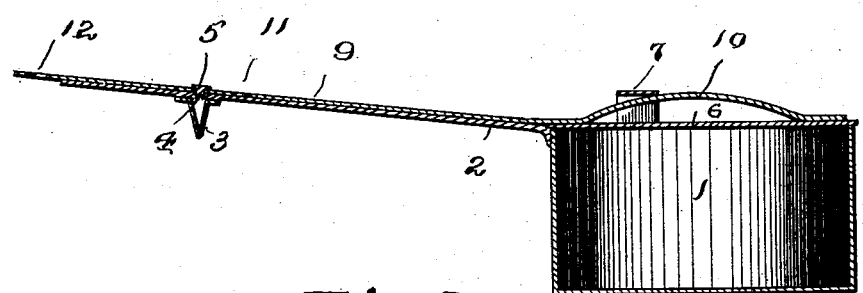
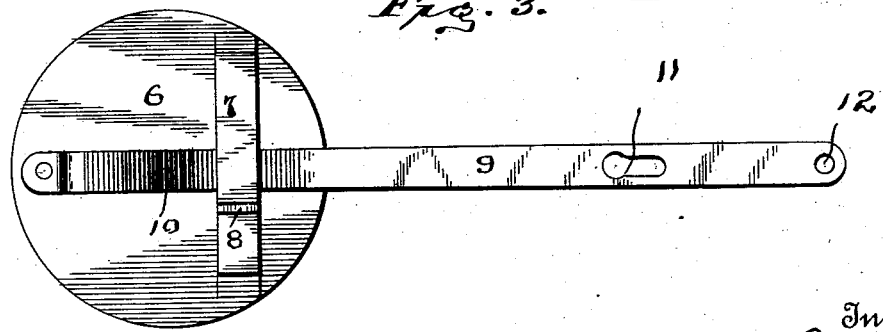
Witnesses
C. D. Hesler,
L. W. Graves.
Inventor,
George Curley,
by John Wedderburn
Attorney

UNITED STATES PATENT OFFICE.

GEORGE CURLEY, OF SALT LAKE CITY, UTAH.

SAUCEPAN-COVER.

SPECIFICATION forming part of Letters Patent No. 568,970, dated October 6, 1896.

Application filed July 10, 1896. Serial No. 598,710. (No model.)

*To all whom it may concern:*

Be it known that I, GEORGE CURLEY, a citizen of the United States, residing at Salt Lake City, in the county of Salt Lake and State of Utah, have invented certain new and useful Improvements in Saucepan-Covers; and I do hereby declare the following to be a full, clear, and exact description of the invention, such as will enable others skilled in the art to which it appertains to make and use the same.

My invention relates to improvements in covers for saucepans and the like, the object of the same being to provide a cover which can be easily applied to and removed from the top of saucepans, and which will permit the pouring off of the boiling water contained in said saucepan without danger of burning the hands.

The invention consists of a cover made up of a flat disk of metal, an arched strip secured to the top surface thereof, and a handle pivoted to one side of said disk, passing beneath said arched strip and curved outwardly throughout that part of its length which extends over the top surface of said disk, engaging the under surface of said strip and holding said handle and cover in frictional engagement one with the other, the said handle being provided with a keyhole-slot which is adapted to fit over and be engaged by a headed pin or projection on the pan-handle.

The invention also consists in other details of construction and combinations of parts which will be hereinafter more fully described and claimed.

In the drawings forming part of this specification, Figure 1 represents a perspective view of my saucepan-cover, (shown applied,) the said cover being shown in dotted lines in the position which it assumes when it is desired to pour off the boiling water contained in said pan. Fig. 2 is a longitudinal section through the same. Fig. 3 is a plan view of the cover detached.

Like reference-numerals indicate like parts in the different views.

The saucepan 1 has a handle 2 extending outwardly from one side thereof, which has a projection 3 upon its under side for a purpose which will appear later. On the top surface of said handle is a pin 4, having a head 5 upon its upper end.

My improved cover is made of a flat disk of metal 6, and has secured to the upper side thereof an arched strip 7, having a projection 8 thereon, by means of which said cover may be shifted. Pivoted at one side of the cover 6 is a handle 9, which is curved outwardly, as shown at 10, passes beneath the arched strip 7, and bears with spring-pressure against the under side of said strip. The said handle 9 extends outwardly in line with the handle 2 of the saucepan 1 and has a keyhole-slot 11 therein, which fits over the pin 4 on the handle 2 and is engaged by the head 5 on said pin when the cover is in its closed position. The handle 9 is slightly longer than the handle 2, by means of which it may be easily shifted upon the pan, and is provided with a slot or opening 12 in its outer end, by means of which it may be hung up.

When the cover 6 is in place upon the top of a sacepan, the same is held from displacement by the engagement of the head 5 on the pin 4 with the narrow portion of the keyhole-slot 11 in the handle 9. If it be desired to partially open the pan, the same may be readily done by shifting the outer end of the handle 9 upon its temporary pivotal connection on the pin 4. To remove the cover, the handle 9 is drawn rearwardly, bringing the head 5 of the pin 4 opposite the enlarged portion of the slot 11, when the same may be readily removed. During both these operations the pan may be held steady by pressing with the fingers against the projection 3 upon the under side of the handle 2. If it be desired to drain off the boiling water in the pan 1, the handle 9 is held rigidly in contact with the handle 2 and the cover 6 shifted by the handle or projection 8 upon the strip 7. In whatever position the cover 6 is adjusted relatively to the handle 9 the same is held in such position and prevented from displacement by the frictional engagement of the curved portion 10 of the handle 9 with the under side of the strip 7. The said saucepan may thereby be held partially open and the boiling water poured therefrom.

Having now described my invention, what I claim as new, and desire to secure by Letters Patent, is—

1. The combination with a saucepan having a handle projecting outwardly therefrom, of a cover therefor, a handle attached to said cover, extending outwardly therefrom, resting upon the handle of said pan and pivotally connected thereto, substantially as and for the purpose described.

2. The combination with a saucepan having a handle projecting outwardly therefrom, with a headed pin upon its upper side, of a cover for said pan having a handle extending outwardly therefrom, resting upon the handle of said pan and provided with a keyhole-slot within which said headed pin fits, whereby a pivotal connection between said handles is formed and whereby said cover may be readily detached from the handle of the pan.

3. The combination with a saucepan having a handle projecting outwardly therefrom with a headed pin upon its upper side and a projection upon its under side, of a cover for said pan having a handle extending outwardly therefrom, resting upon the handle of said pan, extending slightly beyond the outer end thereof and provided with a keyhole-slot therein, within which said headed pin fits, whereby a pivotal connection between said handles is formed and whereby said cover-handle may be readily detached from the handle of the pan.

4. The combination with a saucepan having a handle projecting outwardly therefrom, of a cover for said pan, having an arched strip of metal upon its upper side and a handle for said cover pivotally connected thereto near one edge thereof, extending outwardly beneath said arched strip and curved slightly so that it engages the under side of said strip and holds said cover in frictional contact therewith.

5. The combination with a saucepan having a handle projecting outwardly therefrom, of a cover for said pan having an arched strip of metal upon its upper side, a projection on said strip and a handle for said cover pivotally connected thereto near one edge thereof, extending outwardly beneath said arched strip and curved slightly, so that it engages the under side of said strip and holds said cover in frictional contact therewith.

In testimony whereof I have signed this specification in the presence of two subscribing witnesses.

GEORGE CURLEY.

Witnesses:
  C. J. BRAIN,
  FRANK Y. TAYLOR.